United States Patent
Rieger et al.

(10) Patent No.: US 11,531,566 B2
(45) Date of Patent: Dec. 20, 2022

(54) SAFE AND SECURE COMMUNICATION NETWORK MESSAGE PROCESSING

(71) Applicant: Infineon Technologies AG, Neubiberg (DE)

(72) Inventors: Viola Rieger, Munich (DE); Uli Kretzschmar, Munich (DE)

(73) Assignee: Infineon Technologies AG, Neubiberg (DE)

(*) Notice: Subject to any disclaimer, the term of this patent is extended or adjusted under 35 U.S.C. 154(b) by 257 days.

(21) Appl. No.: 16/946,885

(22) Filed: Jul. 10, 2020

(65) Prior Publication Data

US 2022/0012092 A1 Jan. 13, 2022

(51) Int. Cl.
*G06F 9/48* (2006.01)
*H04L 67/12* (2022.01)
*G06F 21/72* (2013.01)

(52) U.S. Cl.
CPC .......... *G06F 9/4881* (2013.01); *G06F 9/485* (2013.01); *G06F 9/4812* (2013.01); *G06F 21/72* (2013.01); *H04L 67/12* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 9,606,836 B2 | 3/2017 | Burger et al. | |
| 9,847,980 B2 | 12/2017 | Burger et al. | |
| 10,958,576 B2 | 3/2021 | Joshi et al. | |
| 2003/0187945 A1* | 10/2003 | Lubbers | H04L 67/101 |
| | | | 709/213 |
| 2013/0275776 A1* | 10/2013 | Baptist | H04L 9/0825 |
| | | | 713/193 |
| 2019/0057484 A1* | 2/2019 | Iwamoto | G06F 9/4881 |
| 2019/0073225 A1* | 3/2019 | Mace | G06F 9/3822 |

FOREIGN PATENT DOCUMENTS

| | | |
|---|---|---|
| CN | 107710161 A | 2/2018 |
| CN | 107750363 A | 3/2018 |
| CN | 111565139 A | 8/2020 |

\* cited by examiner

*Primary Examiner* — Charlie Sun
(74) *Attorney, Agent, or Firm* — Harrity & Harrity, LLP

(57) ABSTRACT

A message processing component may include an execution unit configurable to execute a set of tasks associated with one or more communication network messages. The set of tasks may include at least one of a message evaluation task or a cryptography task. The execution unit may be configured to provide functional safety in association with executing the set of tasks. The execution unit includes a set of time-multiplexed partitions. Each partition in the set of time-multiplexed partitions may be configurable to execute only one task included in the set of tasks. The message processing component may include an interface to one or more hardware accelerators available for use in association with the execution of the set of tasks. Only one partition, of the set of time-multiplexed partitions, may have access to the one or more hardware accelerators at a time.

20 Claims, 4 Drawing Sheets

SAFE AND SECURE COMMUNICATION NETWORK MESSAGE PROCESSING

BACKGROUND

A conventional interconnection architecture for a vehicle may be based on, for example, a controller area network (CAN) bus or a local interconnect network (LIN) system bus. Vehicle and technological advancements over time have imparted a variety of requirements on in-vehicle communication. For example, these advancements have caused a number of electronic control units (ECUs) needed in a given vehicle to be increased, which increases cost, price, and complexity of an internal wiring harness associated with the in-vehicle communication system. To simplify the internal wiring harness, a high-speed communication backbone (e.g., Ethernet) has in some cases been introduced to replace multiple medium-speed communication wires with a single high-speed communication connection. This development resulted in a requirement of protocol routing (e.g., CAN over Ethernet), as vehicle manufacturers move toward implementing the high-speed backbone transparently for lower layer ECUs.

SUMMARY

According to some possible implementations, a message processing component may include an execution unit configurable to execute a set of tasks associated with one or more communication network messages, the set of tasks including at least one of a message evaluation task or a cryptography task, wherein the execution unit is configured to provide functional safety in association with executing the set of tasks, and wherein the execution unit includes a set of time-multiplexed partitions, each partition in the set of time-multiplexed partitions being configurable to execute only one task included in the set of tasks; and an interface to one or more hardware accelerators available for use in association with the execution of the set of tasks, wherein only one partition at a time, of the set of time-multiplexed partitions, has access to the one or more hardware accelerators.

According to some possible implementations, a device may include a memory component to provide a communication network message to a message processing component; the message processing component to process the communication network message, the message processing including: an execution unit to execute a task associated with a communication network message, wherein the execution unit is configured to provide functional safety in association with executing the task, and wherein the execution unit includes a set of partitions, a partition in the set of partitions being configured to execute the task, and an interface to a hardware accelerator available for use in association with the execution of the task; and the hardware accelerator, wherein the partition has access to the hardware accelerator during a configurable time slot.

According to some possible implementations, an in-vehicle communication system may include a message processing component including: an execution unit configured to execute a message evaluation task associated with one or more communication network messages and a cryptography task associated with the one or more communication network messages, wherein the execution unit provides functional safety in association with executing the message evaluation task and the cryptography task, and wherein the execution unit includes a first partition associated with executing the message evaluation task, and a second partition associated with executing the cryptography task, wherein the first and second partitions are time-multiplexed in association with executing the message evaluation task and the cryptography task; and an interface to one or more hardware accelerators associated with executing the message evaluation task or the cryptography task, wherein either the first partition or the second partition has access to the one or more hardware accelerators at a given time.

DETAILED DESCRIPTION

Figure 1:
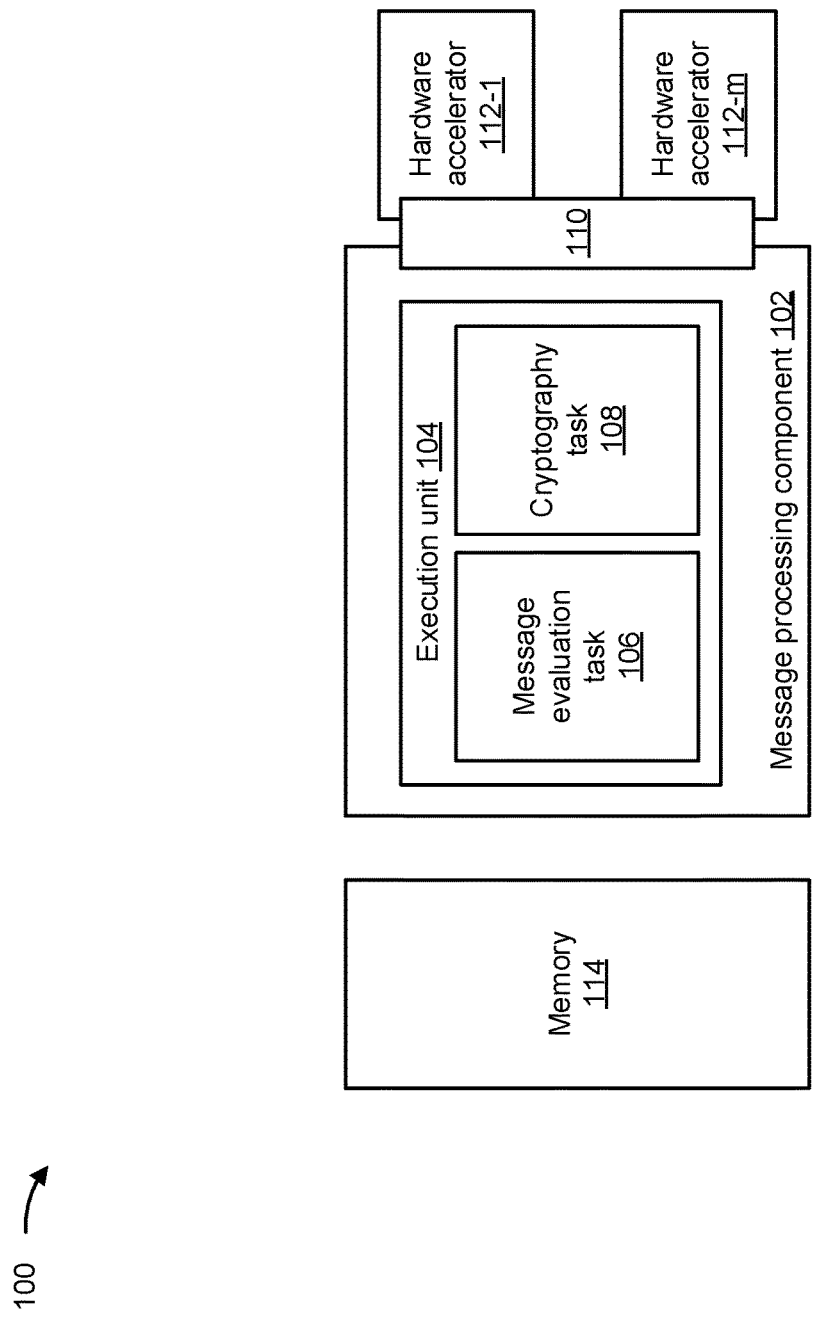
FIG. 1 is a diagram illustrating an example associated with a message processing component that provides safe and secure communication network message processing, as described herein.

The following detailed description of example implementations refers to the accompanying drawings. The same reference numbers in different drawings may identify the same or similar elements.

For simplicity of software in an in-vehicle communication system, having a limited number of communication interfaces is preferable (e.g., since limiting the number of communication interfaces reduces a need for different device drivers and a need to understand multiple protocols). Nevertheless, the number of protocols used in in-vehicle communication systems continues to increase. One reason for the increase is cost—for simple applications (e.g., where LIN could be used) a more complex protocol (e.g., Ethernet) would impart a significant added cost. Another reason for the increase in used protocols is that a feature inherent to a particular protocol may be well-suited for a particular application. For example, a CAN arbitration system may allow reaction on important messages, a Flexray time slicing system may provide a controllable real-time behavior, and advanced Ethernet features (e.g., IEEE1588) may allow for synchronizing internal clocks with a high accuracy. Still another reason for the increase in used protocols is safety and high availability—reliability of a vehicle function, even in the presence of a failure (e.g., a hardware failure, a systematic failure, or due to an external attack), is critical in case in which a loss of the vehicle function could cause harm. Therefore, system diversity is frequently used.

Furthermore, security is an ever-growing challenge for in-vehicle communications. For example, a degree of difficulty for an attacker to access, disrupt, or otherwise impair a vehicle function should be as high as possible. As another example, customer-specific and private data should be protected from access by an attacker. Additionally, even if a single vehicle has been successfully attacked, this successful attack should not have consequences to a fleet of vehicles of the same type (i.e., security of a vehicle should not worsen when an attacker holds knowledge from an attack of a vehicle of the same type). These requirements call for an approach that permits flexible handling of a changing in-vehicle communication system, while enabling a highest possible degree of security.

Notably, there are generally two operation scenarios in a typical in-vehicle communication system. The first operation scenario is configuration and initialization of a request for communication with an external communication unit. The second operation scenario is execution of communication with an external communication unit. Notably, the first operation scenario may be used relatively infrequently, while the second operation scenario is common practice for nearly all in-vehicle communication systems. In a case in which the first and second operation scenarios are used in combination, the first and second operation scenarios are realized as independent processes, with low customization. Thus, underlying hardware may not be efficiently used by software. This is particularly true for realization of security protocols and security services. Additionally, functional safety, automotive cybersecurity, and availability are not yet considered in current in-vehicle communication systems on a broad scale.

Some implementations described herein provide a message processing component that provides safe and secure communication network message processing. In some implementations, the message processing component may process message evaluation tasks and/or cryptography tasks with close relation in hardware and with a high level of safety and security. In some implementations, the message processing component may permit close cooperation of message evaluation tasks and a (configurable) hardware accelerator. Further, the message processing component may enable configuration and execution of an in-vehicle communication to be aligned with efficient, safe, and secure inter-process communication. Additional details are provided below.

FIG. 1 is a diagram of an example of a device 100 that includes a message processing component 102 that provides safe and secure communication network message processing, as described herein. As shown in FIG. 1, in some implementations, device 100 may include a message processing component 102 comprising an execution unit 104 (configurable to execute a message evaluation task 106 and/or a cryptography task 108) and an interface 110. As shown, device 100 may further include a set of hardware accelerators 112 (e.g., hardware accelerators 112-1 through 112-$m$ (m≥1) and a memory component 114.

Message processing component 102 includes a component that provides safe and secure communication network message processing as described herein. In some implementations, message processing component 102 may be included in an in-vehicle communication system. For example, in some implementations, message processing component 102 may be a component in a hardware engine configured for routing of communication network messages in an in-vehicle communication system. As used herein, a communication network message may refer to a message in a peer-to-peer (P2P) network, a message in a broadcast network, and, more generally, a message used for communication with a microcontroller.

As shown in FIG. 1, message processing component 102 includes execution unit 104. Execution unit 104 includes a component configurable to execute one or more tasks associated with one or more communication network messages. The one or more tasks configurable on execution unit 104 may include, for example, a message evaluation task 106 and a cryptography task 108, as shown in FIG. 1. Additional details regarding execution unit 104 are provided below with respect to FIG. 2.

Message evaluation task 106 includes a component configured to perform or trigger performance of one or more functions and/or sub-tasks associated with evaluating of a communication network message. The one or more functions associated with evaluating the communication network message may include, for example, a cryptographic function (e.g., a symmetric key cryptography function encryption/decryption), a message authentication code function for message authentication code verification/generation, a combination of a symmetric key cryptography function and a message authentication code function, and/or the like). Other examples of the one or more functions that may be performed or triggered by message evaluation task 106 include a protocol parser, a key management function, and the like. The one or more sub-tasks associated with evaluating the communication network message may include, for example, message classification, mask selection for a flexible parser, key index selection for flexible parser, freshness information calculation, configuration of a cryptographic function, a key index selection, transfer of a message object, and/or the like.

Cryptography task 108 is a component configured to perform or trigger performance of one or more functions and/or sub-tasks associated with providing security for a communication network message. The one or more functions associated with providing security for the communication network message may include, for example, a public key cryptography function (e.g., RSA, ECC, and/or the like), a hashing function (e.g., MD5, SHA-1, SHA-2, SHA-3, and/or the like), a true random number generation function, a pseudo random number generation function, a key storage function (e.g., including a password storage function and/or a passphrase storage function), and/or the like. The one or more sub-tasks associated with providing security for the communication network message may include, for example, key management, key derivation, firewall control, intrusion detection system control, and/or the like).

As further shown, message processing component 102 may include an interface 110. Interface 110 is interface to the one or more hardware accelerators 112 that allows the one or more tasks to access the one or more hardware accelerators 112. That is, interface 110 may in some implementations be a shared boundary across which tasks on execution unit 104 (e.g., message evaluation task 106 and/or cryptography task 108) and the one or more hardware accelerators 112 can exchange information associated with processing a communication network message.

Hardware accelerator 112 includes a component that can be used in association with execution of one or more tasks configured on execution unit 104. In some implementations, hardware accelerator 112 may include a specialized hardware component designed to execute one or more functions associated with the one or more tasks configured on execution unit 104. The one or more functions may be offloaded to the hardware accelerator 112 to, for example, increase efficiency associated with execution of the function (e.g., as compared to executing the one or more functions on a general-purpose central processing unit). In some implementations, the one or more hardware accelerators may include, for example, a cryptography accelerator, a protocol parser, and/or the like.

Memory component 114 includes a component to store and provide communication network messages to message processing component 102. For example, memory component 114 may be a buffer memory that stores and provides incoming and/or outgoing communication network messages.

In some implementations, message processing component 102 enables different processes (e.g., processes associated with message evaluation and cryptography) to be implemented closely together, which simplifies operation, improves overall safety, and contributes to high availability of vehicle functions. Furthermore, message processing component 102 may improve efficiency in usage of controller hardware resources. For example, configuration of message evaluation task 106 and cryptography task 108 together on execution unit 104 enables tasks associated with evaluating and securing a communication network message to be completed without a need to store or provide sensitive data (e.g., a key) on a shared resource, such as a public communication bus or a public memory. In this way, confidentiality of sensitive data can be ensured by the architecture of message processing component 102.

As indicated above, FIG. 1 is provided as an example. Other examples may differ from what is described with regard to FIG. 1. The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more functions described as being performed by another set of components shown in FIG. 1.

Figure 2:
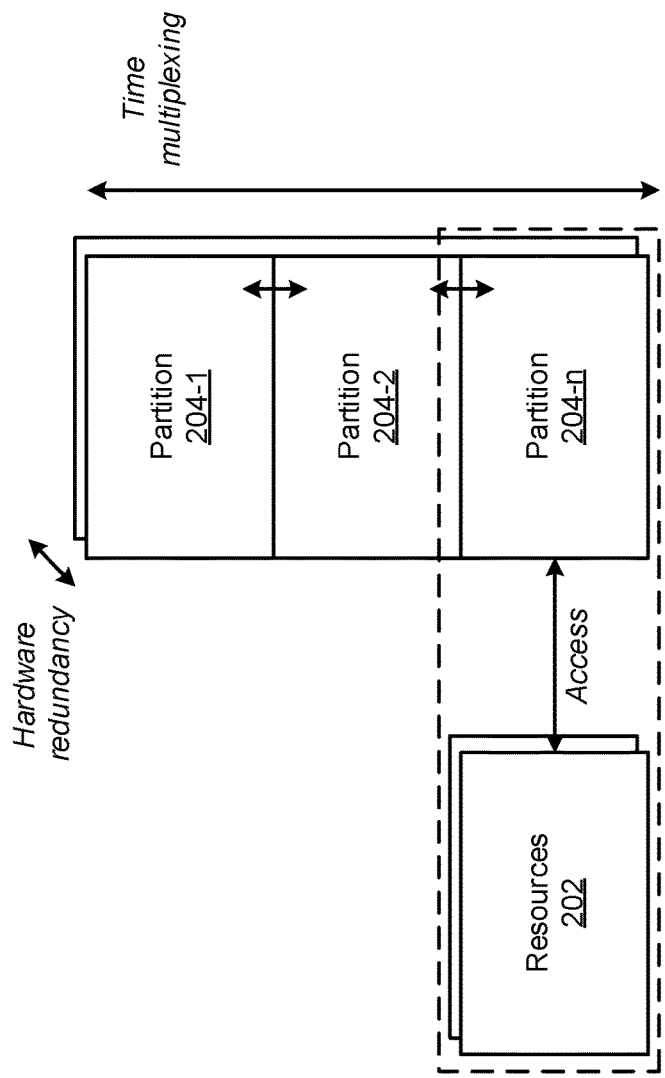
FIG. 2 is a diagram illustrating an example implementation of the execution unit included in the message processing component of FIG. 1, as described herein.

FIG. 2 is a diagram illustrating an example implementation of execution unit 104 included in message processing component 102, as described herein.

In some implementations, execution unit 104 is configured to provide functional safety for message evaluation task 106 and cryptography task 108. In the context of an in-vehicle communication system, functional safety can be defined as an absence of unreasonable risk (e.g., harm to a system, an environment, or to people) due to hazards caused by malfunctioning behavior (e.g., a systematic failure, a random failure, or the like) of an electrical/electronic system. In some implementations, as indicated in FIG. 2, execution unit 104 may be configured to provide functional safety based on hardware redundancy (e.g., such that redundant hardware performs operations being performed by other hardware in lock-step). Additionally, or alternatively, execution unit 104 may be configured to provide functional safety based on information redundancy (e.g., such that information is calculated or modified in a diverse manner, such as calculating a result using two different algorithms). Additionally, or alternatively, execution unit 104 may be configured to provide functional safety based on time redundancy (e.g., such that the same operation is performed by a given hardware component at least twice). In this way, execution unit 104 may provide random fault detection and signaling.

As indicated in FIG. 2, in some implementations, execution unit 104 may be configured with access rights to a set of resources 202, which may include a set of processing and/or storage resources. In some implementations, access rights to resources 202 may be given to execution unit 104 only, meaning that other components in the in-vehicle communication system are not permitted access to the set of resources 202. Exclusive access of execution unit 104 to the set of resources 202 may therefore contribute to integrity, authentication, and availability of the in-vehicle communication system, the associated vehicle functions, and individual ECUs.

In some implementations, as shown in FIG. 2, execution unit 104 may include a set of time-multiplexed partitions 204 (e.g., partitions 204-1 through 204-$n$ (n>1)). In some implementations, each partition 204 is configurable to execute only one task. In some implementations, the individual partitions 204 are implemented via hardware assisted process separation (rather than, for example, a software hypervisor). That is, in some implementations, each partition 204 may be implemented using a dedicated hardware structure of execution unit 104.

In some implementations, an amount of execution time dedicated to each partition 204 is configurable in association with scaling performance of the set of tasks configured on execution unit 104. That is, in some implementations, a percentage or amount of time allocated to a given partition 204 may be configured or adjusted to scale performance of a given task. For example, cryptography task 108 can allocated a relatively large percentage of overall time when high security performance is desired.

In some implementations, execution unit 104 may be configured such that only one partition 204 may have access to one or more hardware accelerators 112 via interface 110 at a given time. In some implementations, the set of time-multiplexed partitions 204 may be configured such that a trigger, an operation, and a read associated with a hardware accelerator 112 occur in different partitions 204. For example, a particular hardware accelerator 112 may be triggered by a first partition 204, and a second partition 204 (e.g., a partition 204 following the first partition 204) may be executed while the particular hardware accelerator 112 performs a computation. Here, a result of the computation may be read by a third partition 204 (e.g., a partition 204 following the second partition 204).

Notably, the design of execution unit 104 allows implementation of any algorithm in software. Therefore, a behavior of execution unit 104 can be modified at a given point in time by implementing software changes, meaning that execution unit 104 provides highly flexible and adaptability (e.g., for a future protocol).

As indicated above, FIG. 2 is provided as an example. Other examples may differ from what is described with regard to FIG. 2. The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more functions described as being performed by another set of components shown in FIG. 2.

Figure 3A:
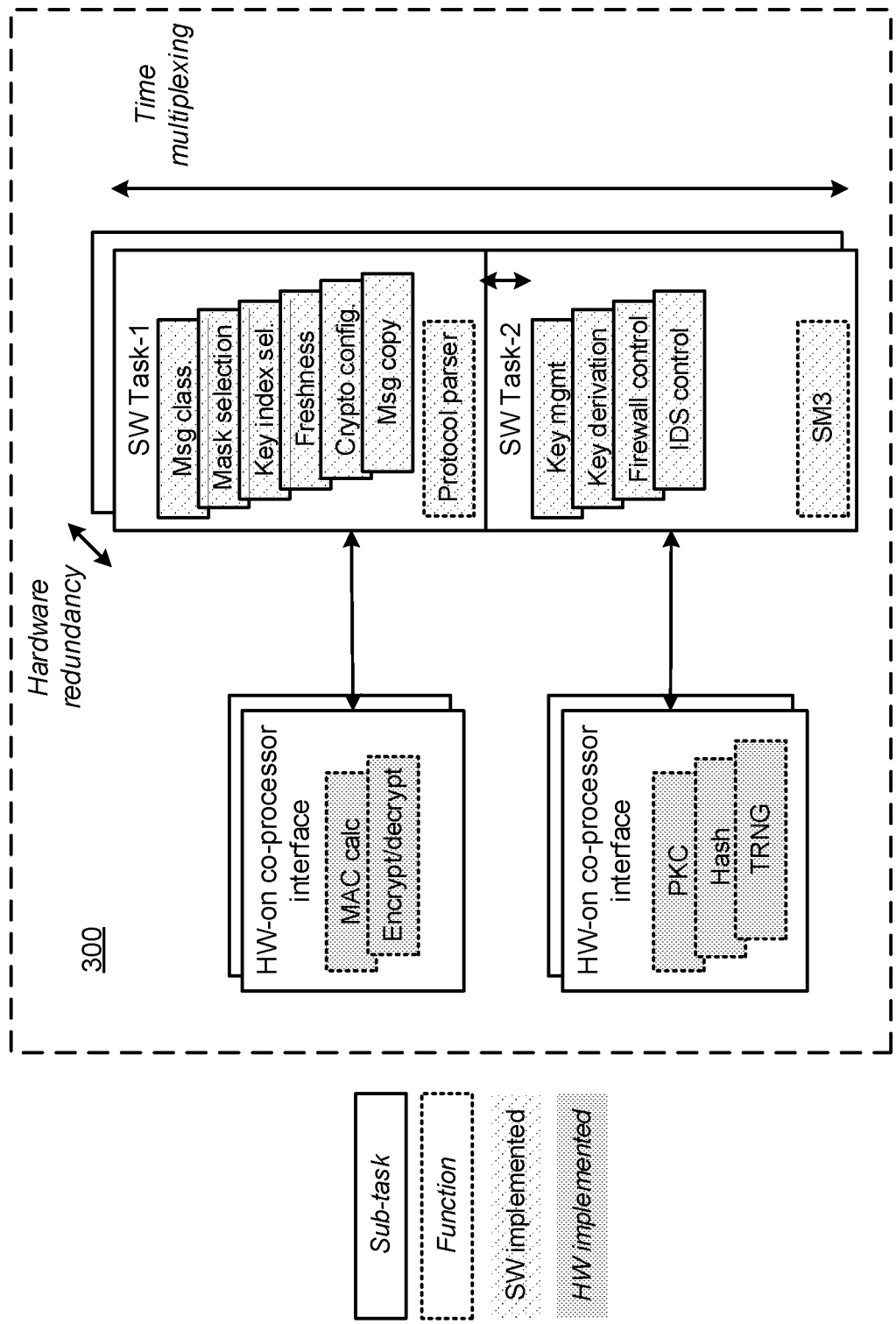
FIGS. 3A and 3B are diagrams illustrating example configurations of the execution unit in CAN flexible data-rate (FD) operation scenarios, as described herein.
Figure 3B:
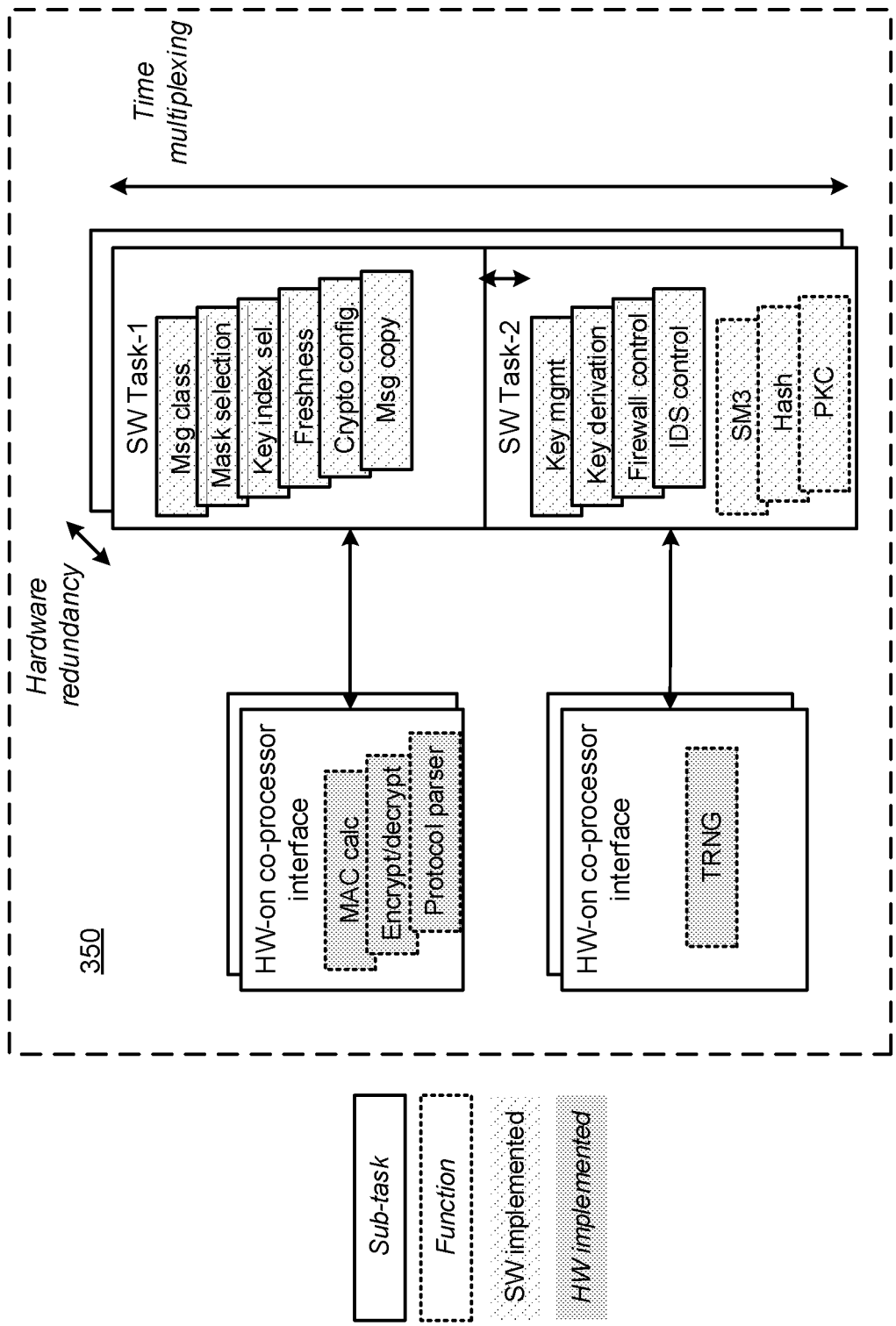

FIGS. 3A and 3B are diagrams illustrating example configurations 300 and 350, respectively, of execution unit 104 in CAN FD operation scenario. For CAN FD in the second operation scenario described above, special message objects requesting a cryptography task for key management or key derivation can occur during initialization of an ECU or during runtime. These special message objects are identified by a first message evaluation task, and the first message evaluation task can be allocated to message evaluation task 106 of execution unit 104. The cryptography task can be allocated to cryptography task 108 of execution unit 104. Further, for CAN FD in the first operation scenario described above, objects requesting a message evaluation task can occur during initialization of an ECU or during runtime.

These special message objects are identified by a second message evaluation task. Here, the second message evaluation task can be also allocated to message evaluation task 106 of execution unit 104.

In this example, functions used by cryptography task 108 include a public key cryptography function, a hash function, an SM3 function, and a true random number generation function. Further sub-tasks of cryptography task 108 include key management, key derivation, firewall control, and intrusion detection system control. Additionally, functions used by message evaluation task 106 include a cryptographic function, a message authentication code function, and a protocol parser. Furthermore, sub-tasks of message evaluation task 106 include message classification, mask selection, key index selection, freshness information calculation, configuration of a cryptographic function, and transfer of a message object.

FIG. 3A shows an example configuration 300 of execution unit 104 for the above described operation scenarios. In example configuration 300, with respect to cryptography task 108, the public key cryptography function, the hash function, and the true random number generation function are hardware implemented by execution unit 104 (e.g., offloaded to one or more hardware accelerators 112), and the SM3 function is software implemented by execution unit 104. As further shown, the key management, key derivation, firewall control, and intrusion detection system control sub-tasks are software implemented by execution unit 104. With respect to message evaluation task 106, the cryptographic function and the message authentication code function are hardware implemented by execution unit 104 (e.g., offloaded to one or more hardware accelerators 112), while the protocol parser is software implemented by execution unit 104. As further shown, the message classification, mask selection, key index selection, freshness information calculation, configuration of a cryptographic function, and transfer of a message object sub-tasks are software implemented by execution unit 104.

FIG. 3B shows an example configuration 350 of execution unit 104 for the above described operation scenarios. In example configuration 350, with respect to cryptography task 108, the true random number generation function is hardware implemented by execution unit 104, and the public key cryptography function, the SM3 function, and the hash function are software implemented by execution unit 104. As further shown, the key management, key derivation, firewall control, and intrusion detection system control sub-tasks are software implemented by execution unit 104. With respect to message evaluation task 106, the cryptographic function, the message authentication code function, and the protocol parser are hardware implemented by execution unit 104. As further shown, the message classification, mask selection, key index selection, freshness information calculation, configuration of a cryptographic function, and transfer of a message object sub-tasks are software implemented by execution unit 104.

As indicated above, FIGS. 3A and 3B are provided as examples. Other examples may differ from what is described with regard to FIGS. 3A and 3B. The number and arrangement of components shown in FIGS. 3A and 3B are provided as examples. In practice, there may be additional components, fewer components, different components, or differently arranged components than those shown in FIGS. 3A and 3B. Furthermore, two or more components shown in FIGS. 3A and 3B may be implemented within a single component, or a single component shown in FIGS. 3A and 3B may be implemented as multiple, distributed components. Additionally, or alternatively, a set of components (e.g., one or more components) shown in FIGS. 3A and 3B may perform one or more functions described as being performed by another set of components shown in FIGS. 3A and 3B.

The message processing component 102 described herein provides numerous improvements for processing of network communication messages. Such improvements include, for example improved efficiency in message evaluation tasks and improved efficiency in communication with cryptographic accelerator. Further advantages include improved secure update capability of a message evaluation task, hardware supported software isolation, reduced software complexity, support for future needs of high availability (autonomous driving), flexible hardware/software distribution, and the ability to use available resources of a hardware security module.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A message processing component, comprising:
an execution unit configurable to execute a set of tasks associated with one or more communication network messages, the set of tasks including at least one of a message evaluation task or a cryptography task,
wherein the execution unit is configured to provide functional safety in association with executing the set of tasks,
wherein the execution unit includes a set of time-multiplexed partitions, a partition in the set of time-multiplexed partitions being configurable to execute only one task included in the set of tasks, and
wherein an amount of execution time dedicated to the partition is configurable in association with scaling performance of the set of tasks; and
an interface to one or more hardware accelerators available for use in association with the execution of the set of tasks,
wherein only one partition, of the set of time-multiplexed partitions, has access to the one or more hardware accelerators at a time.

2. The message processing component of claim 1, wherein individual partitions in the set of time-multiplexed partitions are implemented via hardware assisted process separation.

3. The message processing component of claim 1, wherein the execution unit is configured to provide the functional safety based on at least one of hardware redundancy, information redundancy, or time redundancy.

4. The message processing component of claim 1, wherein the execution unit is configured to provide random fault detection and signaling.

5. The message processing component of claim 1, wherein the set of time-multiplexed partitions is configured such that operation of a hardware accelerator of the one or more hardware accelerators is triggered by a first partition of the set of time-multiplexed partitions, a second partition of the set of time-multiplexed partitions is executed while the hardware accelerator performs a computation, and a result of the computation is read by a third partition of the set of time-multiplexed partitions, the second partition being after the first partition and before the third partition.

6. The message processing component of claim 1, wherein the one or more hardware accelerators include at least one of a cryptography accelerator or a protocol parser.

7. The message processing component of claim 1, wherein the message processing component is included in an in-vehicle communication system.

8. A device, comprising:
a memory component to provide a communication network message to a message processing component;
the message processing component to process the communication network message, the message processing component including:
an execution unit to execute a task associated with a communication network message,
wherein the execution unit is configured to provide functional safety in association with executing the task,
wherein the execution unit includes a set of partitions, a partition in the set of partitions being configured to execute the task, and
wherein an amount of execution time dedicated to the partition is configurable in association with scaling performance of the task;
an interface to a hardware accelerator available for use in association with the execution of the task,
wherein the partition has access to the hardware accelerator during a configurable time slot.

9. The device of claim 8, wherein the task includes at least one of a message evaluation task or a cryptography task.

10. The device of claim 8, wherein the execution unit provides the functional safety based on at least one of hardware redundancy, information redundancy, or time redundancy.

11. The device of claim 8, wherein the execution unit provides random fault detection and signaling.

12. The device of claim 8, wherein the set of partitions is configured such that operation of the hardware accelerator is triggered by a first partition of the set of partitions, a second partition of the set of partitions is executed while the hardware accelerator performs a computation, and a result of the computation is read by a third partition of the set of partitions, the second partition being after the first partition and before the third partition.

13. The device of claim 8, wherein the hardware accelerator includes at least one of a cryptography accelerator or a protocol parser.

14. The device of claim 8, wherein the device is included in an in-vehicle communication system.

15. An in-vehicle communication system, comprising:
a message processing component including:
an execution unit configured to execute a message evaluation task associated with one or more communication network messages and a cryptography task associated with the one or more communication network messages,
wherein the execution unit provides functional safety in association with executing the message evaluation task and the cryptography task,
wherein the execution unit includes a first partition associated with executing the message evaluation task, and a second partition associated with executing the cryptography task, and
wherein the first and second partitions are time-multiplexed in association with executing the message evaluation task and the cryptography task; and
an interface to one or more hardware accelerators associated with executing the message evaluation task or the cryptography task,
wherein either the first partition or the second partition has access to the one or more hardware accelerators at a given time.

16. The in-vehicle communication system of claim 15, wherein the first partition and the second partition are implemented via hardware assisted process separation.

17. The in-vehicle communication system of claim 15, wherein the execution unit is configured to provide the functional safety based on at least one of hardware redundancy, information redundancy, or time redundancy.

18. The in-vehicle communication system of claim 15, wherein an amount of execution time dedicated to each of the first and second partitions is configurable in association with scaling performance of the message evaluation task and the cryptography task.

19. The in-vehicle communication system of claim 15, wherein the execution unit is configured to provide random fault detection and signaling.

20. The in-vehicle communication system of claim 15, wherein the one or more hardware accelerators include at least one of a cryptography accelerator or a protocol parser.

* * * * *